US011682839B2

(12) United States Patent
Wang et al.

(10) Patent No.: US 11,682,839 B2
(45) Date of Patent: Jun. 20, 2023

(54) ANTENNA, TRANSMITTING DEVICE, RECEIVING DEVICE AND WIRELESS COMMUNICATION SYSTEM (71) Applicant: Tyco Electronics (Shanghai) Co. Ltd., Shanghai (CN)

(72) Inventors: Shaoyong Wang, Shanghai (CN); Yuming Song, Shanghai (CN)

(73) Assignee: Tyco Electronics (Shanghai) Co., Ltd., Shanghai (CN)

(*) Notice: Subject to any disclaimer, the term of this patent is extended or adjusted under 35 U.S.C. 154(b) by 31 days.

(21) Appl. No.: 16/780,240

(22) Filed: Feb. 3, 2020

(65) Prior Publication Data
US 2020/0176874 A1 Jun. 4, 2020

Related U.S. Application Data (63) Continuation of application No. PCT/EP2018/071143, filed on Aug. 3, 2018.

(30) Foreign Application Priority Data

Aug. 3, 2017 (CN) .......................... 201710656050.9

(51) Int. Cl.
H01Q 7/00 (2006.01)
H01Q 1/38 (2006.01)
H04B 1/38 (2015.01)

(52) U.S. Cl.
CPC .................. *H01Q 7/00* (2013.01); *H01Q 1/38* (2013.01); *H04B 1/38* (2013.01)

(58) Field of Classification Search
CPC .. H01Q 7/00; H01Q 1/38; H01Q 1/48; H01Q 1/50; H01Q 21/28; H04B 1/38; H04B 5/0025; Y02D 30/70
See application file for complete search history.

(56) References Cited

U.S. PATENT DOCUMENTS 8,077,115 B2 * 12/2011 Yamada ............... H01Q 1/2225
343/866
9,496,616 B2 * 11/2016 Toyao ..................... H01P 5/107
(Continued)

FOREIGN PATENT DOCUMENTS

GB          860 532 A   *  9/1956
GB          860-532 A   * 12/1957
(Continued)

OTHER PUBLICATIONS

PCT Notification, International Search Report and Written Opinion of the International Searching Authority, International Application No. PCT/EP2018/071143, dated Nov. 2, 2018, 14 pages.
(Continued)

*Primary Examiner* — Lester G Kincaid
*Assistant Examiner* — Maryam Soltanzadeh
(74) *Attorney, Agent, or Firm* — Barley Snyder (57) ABSTRACT An antenna includes a substrate, a first circular metal strip disposed on a first surface of the substrate, and a second circular metal strip disposed on a second surface of the substrate. The first circular metal strip has a first end used as a feed end and a second end connected to a first end of a radio frequency resistor. The second circular metal strip has a first end used as a grounding terminal and a second end connected to a second end of the radio frequency resistor.

20 Claims, 5 Drawing Sheets

(56) References Cited

U.S. PATENT DOCUMENTS

| | | | | |
|---|---|---|---|---|
| 2012/0268347 A1* | 10/2012 | Tatarnikov | ........... | H01Q 13/106 |
| | | | | 343/893 |
| 2014/0210678 A1* | 7/2014 | Chen | ...................... | H01Q 13/10 |
| | | | | 343/725 |
| 2014/0240581 A1* | 8/2014 | Sung | ...................... | G03B 17/02 |
| | | | | 348/335 |

FOREIGN PATENT DOCUMENTS

| | | | |
|---|---|---|---|
| GB | 860-532 A | * | 2/1961 |
| GB | 860532 | | 2/1961 |
| JP | 9247006 A | | 9/1997 |

OTHER PUBLICATIONS

Abstract and machine translation of JP9247006, dated Sep. 19, 1997, 6 pages.

\* cited by examiner

ANTENNA, TRANSMITTING DEVICE, RECEIVING DEVICE AND WIRELESS COMMUNICATION SYSTEM

CROSS-REFERENCE TO RELATED APPLICATIONS

This application is a continuation of PCT International Application No. PCT/EP2018/071143, filed on Aug. 3, 2018, which claims priority under 35 U.S.C. § 119 to Chinese Patent Application No. 201710656050.9, filed on Aug. 3, 2017.

FIELD OF THE INVENTION

The present invention relates to an antenna and, more particularly, to an antenna having a substrate and a metal strip.

BACKGROUND

Antennas commonly used in smart home appliances or electronic devices include a dipole antenna, an inverted-F antenna, and the like. These antennas each have a simple structure and high efficiency, and are suitable for a far field communication with a certain distance ($R >> 2D^2/\lambda$, where R is a distance between two antennas for transmitting signals to each other, D is the maximum outer size of the antenna, and $\lambda$ is an operating wavelength of the antenna).

Recently, with increasing and wide application of wireless power supply technology in the field of smart home appliances, a demand for short-range communication with high transmission rate and low far-field radiation leakage has increased. At present, a near field communication (NFC) antenna may be used for short-range communications and has a low far-field radiated power. However, due to its low operating frequency and narrow bandwidth, the NFC antenna cannot realize high-speed communications. In addition, the antenna as described above is generally used for communication in a stationary state. When two antennas need to be rotated mutually, for example, when one antenna is mounted on a wireless high-definition camera, which is powered wirelessly, a relative rotational motion may be generated between the two antennas. Because the NFC antenna is a linearly polarized antenna, and the distance between the two antennas often changes greatly during the rotation, a signal intensity received by the antennas also changes drastically.

In the related art, signal intensity and signal reception quality are generally ensured by increasing transmission power. However, increasing the transmission power may cause communication signals to be leaked into the surrounding environment and is easily eavesdropped by others, thus reducing safety and security of the communication. Therefore, the existing antennae are not suitable for security devices having strict anti-eavesdropping requirements.

SUMMARY

An antenna includes a substrate, a first circular metal strip disposed on a first surface of the substrate, and a second circular metal strip disposed on a second surface of the substrate. The first circular metal strip has a first end used as a feed end and a second end connected to a first end of a radio frequency resistor. The second circular metal strip has a first end used as a grounding terminal and a second end connected to a second end of the radio frequency resistor.

BRIEF DESCRIPTION OF THE DRAWINGS

The invention will now be described by way of example with reference to the accompanying Figures, of which.

DETAILED DESCRIPTION OF THE EMBODIMENT(S)

The technical solution of the disclosure will be described hereinafter in further detail with reference to the following embodiments, taken in conjunction with the accompanying drawings. In the specification, the same or similar reference numerals indicate the same or similar parts. The description of the embodiments of the disclosure hereinafter with reference to the accompanying drawings is intended to explain the general inventive concept of the disclosure and should not be construed as a limitation on the disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

Figure 1:
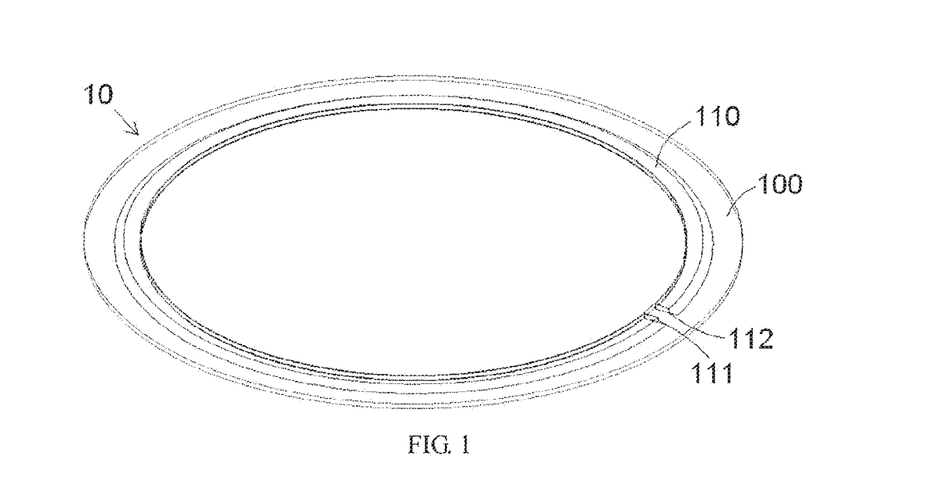
FIG. 1 is a top perspective view of a transmitting antenna according to an embodiment.
Figure 2:
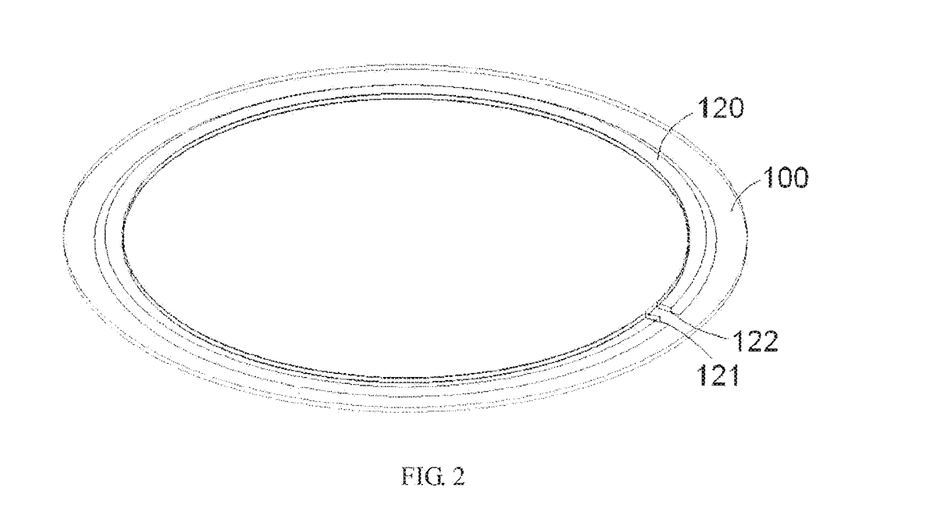
FIG. 2 is a bottom perspective view of the transmitting antenna.
Figure 3:
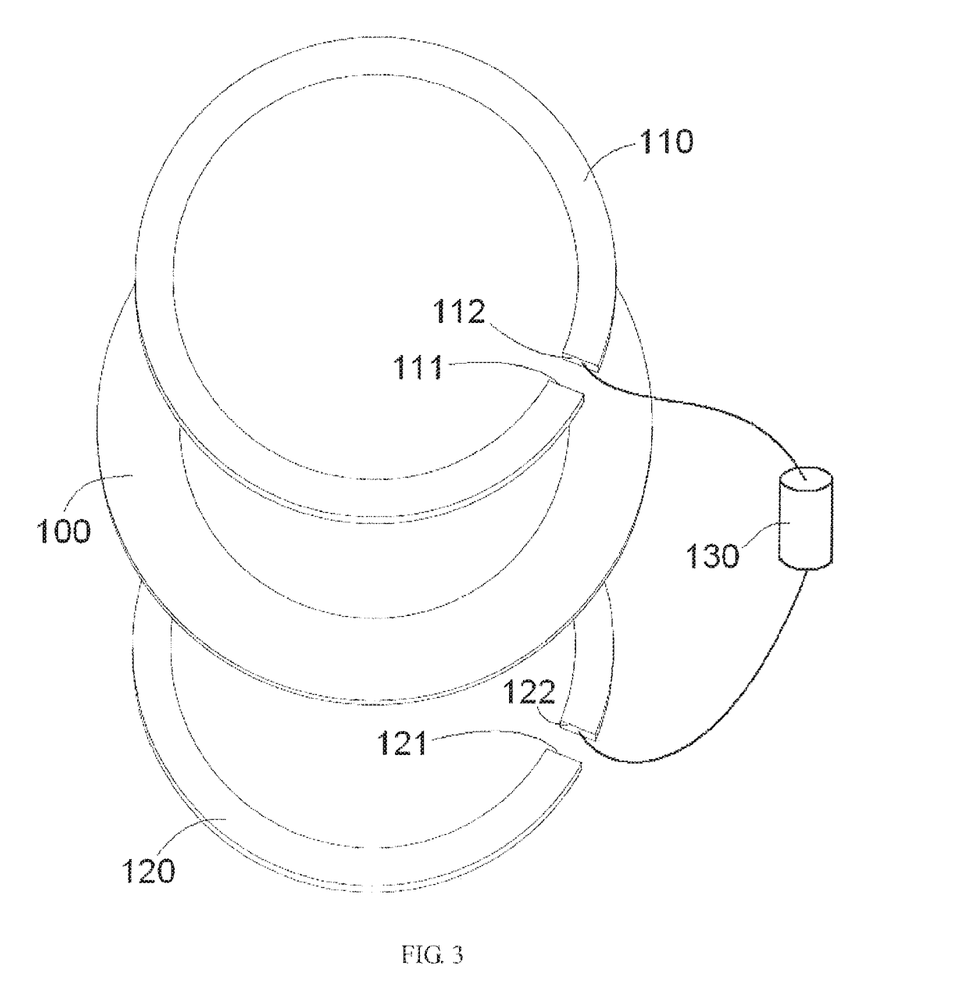
FIG. 3 is a perspective view of the transmitting antenna with a radio frequency resistor.

A transmitting antenna 10 according to an embodiment, as shown in FIGS. 1-3, includes a substrate 100, a first circular metal strip 110 formed on a first surface of the substrate 100, and a second circular metal strip 120 formed on a second surface of the substrate 100 opposite to the first surface.

As shown in FIGS. 1-3, the first circular metal strip 110 has a first end 111 used as a feed end and a second end 112 adapted to be connected to a first end of the radio frequency resistor 130. The second circular metal strip 120 has a first end 121 used as a grounding terminal and a second end 122 adapted to be connected to a second end of the radio frequency resistor 130. In practical application, in an embodiment, the first end 111 of the first circular metal strip 110 is connected to a feed end of a radio frequency chip, and the first end 121 of the second circular metal strip 120 is connected to a grounding terminal of the radio frequency chip.

In an embodiment, the substrate 100 is a circuit board, and the first circular metal strip 110 and the second circular metal strip 120 are each a metal microstrip transmission line printed on the circuit board. The circuit board 100 may have a circular or annular shape.

In the embodiment shown in FIGS. 1-3, a distance between the two ends 111, 112 of the first circular metal strip 110 is within a range of 1 mm to 5 mm. A distance between the two ends 121 and 122 of the second circular metal strip 120 is within a range of 1 mm to 5 mm. Each circular metal strip 110, 120 occupies a full circumference of a circle except for the distance between the ends.

In an embodiment, a transmitting device comprises the transmitting antenna 10 shown in FIGS. 1-3, the radio frequency resistor 130, and a radio frequency chip. In an embodiment, an impedance value of a characteristic impedance of each of the first circular metal strip 110 and the second circular metal strip 120 is substantially equal to a resistance value of the radio frequency resistor 130 connected in series between the strips 110, 120. In an exemplary embodiment, the impedance value of the characteristic impedance of each of the first circular metal strip 110 and the second circular metal strip 120 may be within a range of 30 ohms to 70 ohms. In another exemplary embodiment, the impedance value of the characteristic impedance of each of the first circular metal strip 110 and the second circular metal strip 120, and the resistor value of the radio frequency resistor 130 may be substantially equal to 50 ohms. The characteristic impedance of each of the first circular metal strip 110 and the second circular metal strip 120 may be changed by changing a width and/or thickness of each of the first circular metal strip 110 and the second circular metal strip 120.

Figure 4:
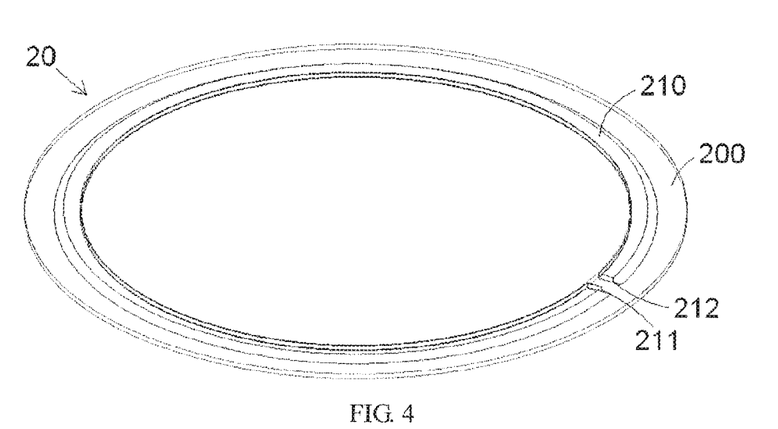
FIG. 4 is a top perspective view of a receiving antenna according to an embodiment.
Figure 5:
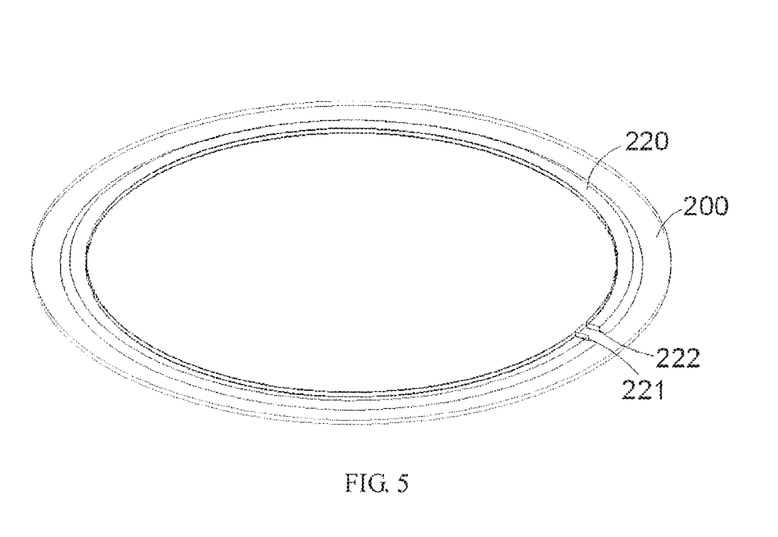
FIG. 5 is a bottom perspective view of the receiving antenna.
Figure 6:
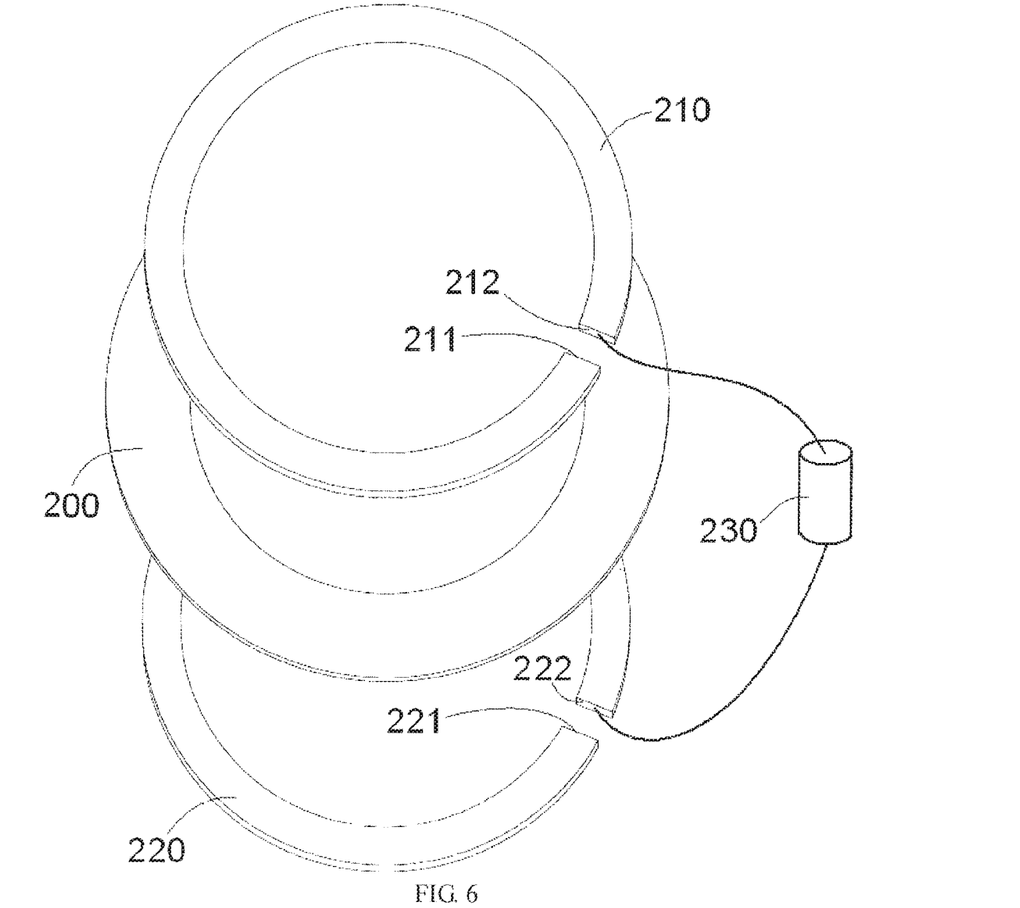
FIG. 6 is a perspective view of the receiving antenna with a radio frequency resistor.

A receiving antenna 20 according to an embodiment, as shown in FIGS. 4-6, includes a substrate 200, a first circular metal strip 210 formed on a first surface of the substrate 200, and a second shaped metal strip 220 formed on a second surface of the substrate 200 opposite to the first surface.

As shown in FIGS. 4-6, the first circular metal strip 210 has a first end 211 used as a feed end and a second end 212 adapted to be connected to a first end of the radio frequency resistor 230. The second circular metal strip 220 has a first end 221 used as a ground terminal and a second end 222 adapted to be connected to a second end of the radio frequency resistor 230. In practical application, in an embodiment, the first end 211 of the first circular metal strip 210 is connected to a feed end of a radio frequency chip, and the first end 221 of the second circular metal strip 220 is connected to a grounding terminal of the radio frequency chip.

In an embodiment, the substrate 200 is a circuit board, and the first circular metal strip 210 and the second circular metal strip 220 are each a metal microstrip transmission line printed on the circuit board. The circuit board 200 may have a circular or annular shape.

In the embodiment shown in FIGS. 4-6, a distance between the two ends 211, 212 of the first circular metal strip 210 is within a range of 1 mm to 5 mm. A distance between the two ends 221 and 222 of the second circular metal strip 220 is within a range of 1 mm to 5 mm. Each circular metal strip 210, 220 occupies a full circumference of a circle except for the distance between the ends.

In an embodiment, a receiving device comprises the receiving antenna 20 shown in FIGS. 4-6, the radio frequency resistor 230, and a radio frequency chip. In an embodiment, an impedance value of the characteristic impedance of each of the first circular metal strip 210 and the second circular metal strip 220 is substantially equal to a resistance value of the radio frequency resistor 230 connected in series between the strips 210, 220. In an exemplary embodiment, the impedance value of the characteristic impedance of each of the first circular metal strip 210 and the second circular metal strip 220 may be within a range of 30 ohms to 70 ohms. In another exemplary embodiment, the impedance value of the characteristic impedance of each of the first circular metal strip 210 and the second circular metal strip 220, and the resistor value of the radio frequency resistor 230 may be substantially equal to 50 ohms. The characteristic impedance of each of the first circular metal strip 210 and the second circular metal strip 220 may be changed by changing a width and/or thickness of each of the first circular metal strip 210 and the second circular metal strip 220.

Figure 7:
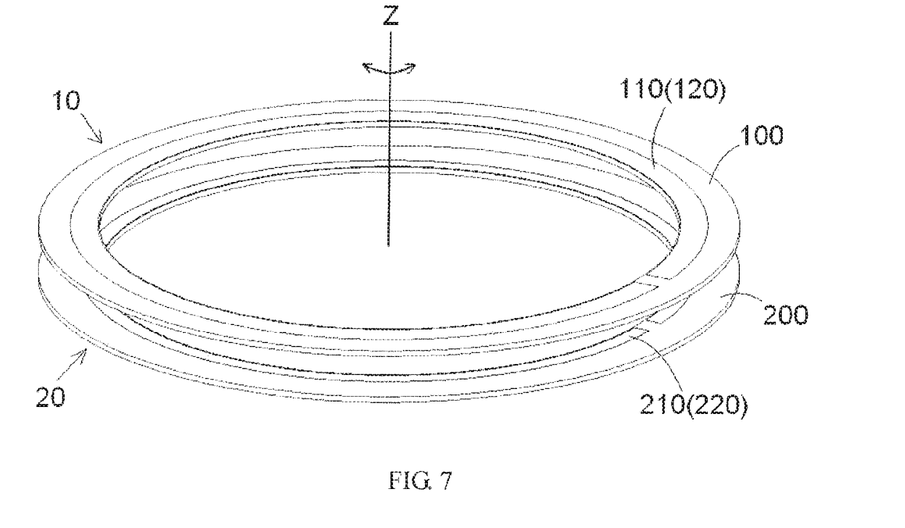
FIG. 7 is a perspective view of a wireless communication system including the transmitting antenna and the receiving antenna.

A wireless communication system including the transmitting device and the receiving device is shown in FIG. 7. The transmitting antenna 10 and the receiving antenna 20 are shown in operation in FIG. 7. The transmitting antenna 10 and the receiving antenna 20 have a common central axis Z about which at least one of the transmitting antenna 10 and the receiving antenna 20 may be rotated. In the shown embodiment, the transmitting antenna 10 and the receiving antenna 20 may be rotated about the same central axis Z.

When one of the transmitting antenna 10 and the receiving antenna 20 is rotated with respect to the other, the distance between the transmitting antenna 10 and the receiving antenna 20 will not be changed. Therefore, it is possible to ensure signal intensity and signal receiving quality without increasing transmission power. Moreover, because it is unnecessary to increase the transmission power, far field radiation energy is very low. In this way, it is possible to effectively prevent communication signals from being leaked into the surrounding environment and being eavesdropped by others, thereby improving safety and security of the communication.

The impedance value of the characteristic impedance of each of the circular metal strips 110, 120, 210, 220 is substantially equal to the resistance value of the radio-frequency resistors 130, 230 connected in series between them. Therefore, when feeding the antennas 10, 20, an electromagnetic wave within each of the circular metal strips 110, 120, 210, 220 is a traveling wave only propagating in one direction, while the traditional far-field antenna may be operated in a resonant state, and the electromagnetic field therein is in the form of a standing wave. The antennas 10, 20 have a wide bandwidth similar to a transmission line, and the electric field around the circular traveling wave antenna is a circular polarization, and the polarization mode thereof is not affected by its own rotation angle. As shown in FIG. 7, when the two antennas 10, 20 are placed in parallel and close to each other at a coaxial distance ($R<<2D^2/\lambda$), the electromagnetic wave emitted by one antenna may be effectively received by the other. At the same time, because the antennas 10, 20 of the disclosure are near-field antennas, their far field radiation energy are very low, and it is very difficult to capture the signals at a long distance.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the disclosure have been described hereinbefore in detail with reference to the attached drawings, it should be appreciated that the disclosed embodiments in the attached drawings are intended to illustrate the embodiments of the disclosure by way of example, and should not be construed as limitation to the disclosure.

Although several exemplary embodiments of the general concept of the disclosure have been shown and described, it would be appreciated by those skilled in the art that various changes or modifications may be made to these embodiments without departing from the principles and spirit of the disclosure, the scope of which is defined by the claims and their equivalents.

What is claimed is:

1. An antenna, comprising:
    a substrate;
    a first circular metal strip mounted on a first surface of the substrate, the first circular metal strip has a first free end directly connected to a feed source and a second free end directly fixedly connected to a first end of a radio frequency resistor, the first end of the radio frequency resistor connected only to the second free end of the first circular metal strip; and
    a second circular metal strip mounted on a second surface of the substrate, the second circular metal strip has a first free end directly connected to a grounding terminal and a second free end directly fixedly connected to a second end of the radio frequency resistor, the second end of the radio frequency resistor connected only to the second free end of the second circular metal strip, a distance between the first circular metal strip and the second circular metal strip is fixed according to a thickness of the substrate.

2. The antenna of claim 1, wherein the substrate is a circuit board.

3. The antenna of claim 2, wherein the first circular metal strip and the second circular metal strip are each a metal microstrip transmission line printed on the circuit board.

4. The antenna of claim 2, wherein the circuit board has an annular shape.

5. The antenna of claim 1, wherein a distance between the first end and the second end of the first circular metal strip, or between the first end and the second end of the second circular metal strip, is within a range of 1 mm to 5 mm.

6. The antenna of claim 1, wherein the antenna is a transmitting antenna or a receiving antenna.

7. A transmitting device, comprising:
    a radio frequency chip;
    a radio frequency resistor; and
    a transmitting antenna including a substrate, a first circular metal strip mounted on a first surface of the substrate, and a second circular metal strip mounted on a second surface of the substrate, the first circular metal strip has a first free end directly connected to a feed end of the radio frequency chip and a second free end directly fixedly connected to a first end of the radio frequency resistor, the first end of the radio frequency resistor connected only to the second free end of the first circular metal strip, the second circular metal strip has a first free end directly connected to a grounding terminal of the radio frequency chip and a second free end directly fixedly connected to a second end of the radio frequency resistor, an impedance value of a characteristic impedance of each of the first circular metal strip and the second circular metal strip is substantially equal to a resistance value of the radio frequency resistor, a distance between the first circular metal strip and the second circular metal strip is fixed according to a thickness of the substrate.

8. The transmitting device of claim 7, wherein the impedance value of the characteristic impedance of each of the first circular metal strip and the second circular metal strip is within a range of 30 ohms to 70 ohms.

9. The transmitting device of claim 7, wherein the substrate is a circuit board.

10. The transmitting device of claim 9, wherein the first circular metal strip and the second circular metal strip are each a metal microstrip transmission line printed on the circuit board.

11. The transmitting device of claim 7, wherein a distance between the first end and the second end of the first circular metal strip, or between the first end and the second end of the second circular metal strip, is within a range of 1 mm to 5 mm.

12. A receiving device, comprising:
    a radio frequency chip;
    a radio frequency resistor; and
    a receiving antenna including a substrate, a first circular metal strip mounted on a first surface of the substrate, and a second circular metal strip mounted on a second surface of the substrate, the first circular metal strip has a first free end directly connected to a feed end of the radio frequency chip and a second free end directly fixedly connected to a first end of the radio frequency resistor, the second circular metal strip has a first free end directly connected to a grounding terminal of the radio frequency chip and a second free end directly fixedly connected to a second end of the radio frequency resistor, the second end of the radio frequency resistor connected only to the second free end of the second circular metal strip, an impedance value of a characteristic impedance of each of the first circular metal strip and the second circular metal strip is substantially equal to a resistance value of the radio frequency resistor, a distance between the first circular metal strip and the second circular metal strip is fixed according to a thickness of the substrate.

13. The receiving device of claim 12, wherein the impedance value of the characteristic impedance of each of the first circular metal strip and the second circular metal strip is within a range of 30 ohms to 70 ohms.

14. The receiving device of claim 12, wherein the substrate is a circuit board.

15. The receiving device of claim 12, wherein a distance between the first end and the second end of the first circular metal strip, or between the first end and the second end of the second circular metal strip, is within a range of 1 mm to 5 mm.

16. A wireless communication system, comprising:
    a transmitting device including a first radio frequency chip, a first radio frequency resistor, and a transmitting antenna, the transmitting antenna including a substrate, a first circular metal strip mounted on a first surface of the substrate, and a second circular metal strip mounted on a second surface of the substrate, the first circular metal strip has a first free end directly connected to a feed end of the first radio frequency chip and a second free end directly fixedly connected to a first end of the first radio frequency resistor, the first end of the first radio frequency resistor connected only to the second free end of the first circular metal strip, the second circular metal strip has a first free end directly connected to a grounding terminal of the first radio frequency chip and a second free end directly fixedly connected to a second end of the first radio frequency resistor, the second end of the first radio frequency resistor connected only to the second free end of the second circular metal strip, an impedance value of a characteristic impedance of each of the first circular metal strip and the second circular metal strip is substantially equal to a resistance value of the first radio frequency resistor, a distance between the first circular metal strip and the second circular metal strip is fixed according to a thickness of the substrate; and a receiving device independent of the transmitting device and including a second radio frequency chip, a second radio frequency resistor, and a receiving antenna, the receiving antenna including a substrate, a first circular metal strip mounted on a first surface of the substrate, and a second circular metal strip mounted on a second surface of the substrate, the first circular metal strip has a first free end directly connected to a feed end of the second radio frequency chip and a second free end directly fixedly connected to a first end of the second radio frequency resistor, the first end of the second radio frequency resistor connected only to the second free end of the first circular metal strip, the second circular metal strip has a first free end directly connected to a grounding terminal of the second radio frequency chip and a second free end directly fixedly connected to a second end of the second radio frequency resistor, the second end of the second radio frequency resistor connected only to the second free end of the second circular metal strip, an impedance value of a characteristic impedance of each of the first circular metal strip and the second circular metal strip is substantially equal to a resistance value of the second radio frequency resistor.

17. The wireless communication system of claim 16, wherein the transmitting antenna and the receiving antenna have a common central axis about which at least one of the transmitting antenna or the receiving antenna is rotated.

18. The wireless communication system of claim 17, wherein a distance between the transmitting antenna and the receiving antenna in an axial direction of the common central axis is fixed as the at least one of the transmitting antenna or the receiving antenna is rotated.

19. The antenna of claim 1, wherein the first circular metal strip and the second circular metal strip are arranged about a common central axis, the first circular metal strip arranged above and overlapping the second circular metal strip in an axial direction of the central axis.

20. The antenna of claim 19, wherein the first circular metal strip and the second circular metal strip share at least one of a common inner or outer diameter.

* * * * *